June 6, 1967          H. C. LALESSE          3,323,392

TRANSMISSION FOR A SELF-STARTING SYNCHRONOUS MOTOR

Filed June 7, 1965

INVENTOR.
HERMAN C. LALESSE
BY
*Frank R. Trifari*
AGENT

United States Patent Office 3,323,392
Patented June 6, 1967

3,323,392
TRANSMISSION FOR A SELF-STARTING
SYNCHRONOUS MOTOR
Herman Cornelis Lalesse, Emmasingel, Eindhoven, Netherlands, assignor to North American Philips Company, Inc., New York, N.Y., a corporation of Delaware
Filed June 7, 1965, Ser. No. 461,818
Claims priority, application Netherlands, June 9, 1964, 6,406,487
3 Claims. (Cl. 74—812)

The invention relates to a transmission mechanism for a self-starting synchronous motor in which the motor may rotate in either clockwise or counter-clockwise direction but an output shaft rotates in one given direction only. Such transmissions are used, for example, in electric clocks, record players, tape recorders and the like.

Self-starting synchronous motors are simple sources of energy which can be manufactured at comparatively low costs, yet have a comparatively high efficiency and also require little maintenance, inter alia because they have no brushes. They have, however, the disadvantage that they rotate arbitrarily in either of two directions when starting and, moreover, the starting torque is low as compared with the power produced at full speed.

Therefore a primary object of this invention is to provide a transmission whereby many new uses of synchronous motors is provided since independently of the direction of rotation of the motor shaft, the output shaft driven by said motor always rotates in the same direction and also provides a delay in loading the motor which overcomes its low starting torque.

Briefly described, a transmission according to the invention is characterized by a spool in which the axial bore is provided with internal threads engaging the correspondingly threaded motor shaft so that the spool shifts in one direction when the motor turns in a clockwise direction and the opposite direction when the motor rotates counterclockwise. The output shaft has a disc located between the spool flanges whereby the output shaft rotates in the same direction when engaged by one or the other of the spool flanges.

According to a further feature of the invention, the spool is provided with air vanes to assist shifting the spool relative to the motor shaft and output shaft.

The above and other features, objects and advantages of the present invention will be fully understood from the following description considered in connection with the accompanying illustrative drawings.

Figure 1:
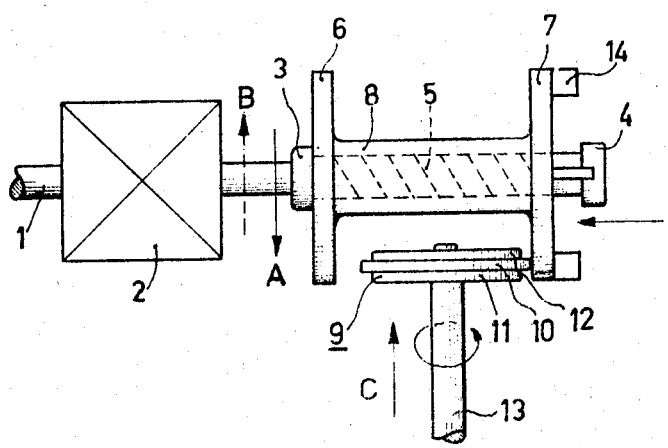
Figure 2:
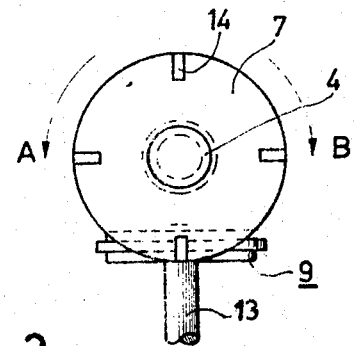

FIG. 1 is a schematic side elevation of a transmission between a shaft driven by a self-starting synchronous motor and an output shaft and FIG. 2 is an end elevation of the transmission of FIG. 1 viewed in the direction of the arrow or from the right side of FIG. 1.

Referring to the figures reference numeral 1 designates a shaft, on which a rotor 2 of a self-starting synchronous motor is arranged in known manner. The shaft 1 is provided with two collars 3 and 4, between which a non-self-braking screw thread 5 is provided. A spool 8 having two flanges 6 and 7 is connected with shaft 1 between collars 3 and 4.

The internal bore of spool 8 is provided with a screw thread adapted to cooperate with the screw thread 5.

Between the flanges 6 and 7 there is arranged a disc 9 having a rubber ring 10 enclosed between two plates 11 and 12. This disc 9 is secured to output shaft 13 which is to be loaded. Finally the disc 7 is provided with four vanes 14.

The shaft 13 must rotate in one direction only.

When the motor, the rotor of which is designated 2, is switched on it cannot be predicted in which direction the rotor will turn.

If, viewed from the side of the motor towards the transmission, the direction of rotation is clockwise, i.e. in the direction of the full arrow A. The spool 8 rotates in the same direction. The spool is braked by an air drag or resistance via the vanes 14, so that it tends to lag behind. The screw thread 5, which has a right-hand pitch, urges the spool 8 against the collar 3, whereby the spool is positively driven by the motor. The disc 9, the rubber ring of which engages the inner side of the disc 7 will thus rotate clockwise viewed in the direction of the arrow C, which is the desired direction of rotation of the shaft 13.

However, if after a standstill and after the current has been resupplied, the rotor 2 rotates counter-clockwise, indicated by the broken arrow B, viewed in the same direction as described above, the air resistance of the vanes 14 again causes the spool to move relative to shaft 1, i.e. it lags behind the rotation of the shaft 1. Consequently, the spool moves to the right (FIG. 1) until it abuts against the collar 4 and is then positively driven by the shaft 1. Then the flange 6 and disc 9 cooperate with each other and it is apparent that the direction of rotation of the shaft 13 is, as before, clockwise as desired. The result of the transmission described above therefore is that the direction of rotation of the shaft 13 is independent of the direction of rotation of the driven shaft 1, thus the use of inexpensive, self-starting synchronous motor is rendered possible. In operation such a motor requires little or no maintenance and develops only a small amount of heat since no brushes are present and the useful effect is comparatively high.

When the motor current supply is switched off and the motor stands still, deceleration of the motor shaft will cause the spool 8 to disengage the flanges 6 or 7 from the output disc 9. The motor can therefore start practically under no-load conditions since the starting load, then formed only by the air resistance of the vanes 14, is negligible. This is very advantageous in view of the low starting torque of such a motor.

The screw thread 5 is not essential since equivalent arrangements are known, for example, a slanting wedge or the like to drive the spool against collars 3 and 4 and establish a connection between the spool 8 and the shaft 1.

The vanes 14 may also be replaced by another resistance, for example, a small braking shoe loaded by a weak spring.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed to be new and useful and secured by Letters Patent of the United States is:

1. A transmission for a synchronous motor comprising a synchronous motor having a shaft, said shaft having a pair of spaced collar means secured thereto, a spool concentric with said shaft between said collar means, means for driving said spool against one said collar upon rotation of said shaft in one direction of rotation and against the other of said collars upon rotation of said shaft in the other direction of rotation, and an output shaft having a driven wheel, said driven wheel being located between the flanges of said spool, said collars being spaced apart a distance greater than the axial length of said spool whereby said spool is axially movable relative to said shaft, the diameter of said driven wheel being chosen for engagement with one said flange of said spool positioned against said collars.

2. A transmission for a synchronous motor according to claim 1 wherein said means for driving said spool against said collars comprises an internal thread in the bore of said spool and a corresponding external thread on said shaft between said collars.

3. A transmission for a synchronous motor according to claim 1 with the addition of drag means connected with said spool.

References Cited

UNITED STATES PATENTS

| | | | |
|---|---|---|---|
| 1,441,528 | 1/1923 | Reid et al. | 74—812 |
| 2,687,658 | 8/1954 | Nelson et al. | 74—812 |
| 2,718,161 | 9/1955 | Nelson et al. | 74—812 |

MARK NEWMAN, *Primary Examiner.*

A. T. McKEON, *Assistant Examiner.*